July 10, 1962  D. S. BRINSMADE  3,042,980
REINFORCED INFLATABLE SEAL AND METHOD OF MAKING
Filed March 2, 1960

INVENTOR
Daniel Seymour Brinsmade

BY
ATTORNEYS

United States Patent Office 3,042,980
Patented July 10, 1962

3,042,980
REINFORCED INFLATABLE SEAL AND METHOD OF MAKING
Daniel Seymour Brinsmade, Bethany, Conn., assignor to The Connecticut Hard Rubber Company, New Haven, Conn., a corporation of Connecticut
Filed Mar. 2, 1960, Ser. No. 12,441
1 Claim. (Cl. 20—69)

This invention relates to inflatable sealing strips for spaced-apart elements and especially to sealing closures such, for example, as aircraft canopy seals for apertured walls subject to differential pressure at the two sides of the walls.

It is customary in aircraft design to provide extruded or molded rubber tubing of circular, square or other cross-sectional shape in the uninflated condition and spliced together by a joint perpendicular to the longitudinal axis of the tubing so as to be endless and inflatable for closing the gap between the plastic canopy aircraft wall compartment or cockpit. In modern aircraft the security of such seals is of vital importance to the pilot at altitudes of 60,000 feet or higher where normal atmospheric pressure of 14.7 pounds per square inch is reduced exteriorly to approximately 1 pound per square inch. Although customarily equipment in the nature of pressure suits and oxygen masks are standard equipment in high altitude service aircraft, the pilot, for reasons of personal comfort, prefers to rely on the artificially maintained pressure and oxygen supply within the plane fuselage. It, therefore, is of the very utmost necessity that the pressure be maintained constant at all times within the enclosure since any fault in the inflatable seal could have fatal consequences. A further problem which arises in high altitude aircraft is the very low temperature conditions of, for example, —65° Fahrenheit which could adversely affect and brittlize seals of ordinary rubber compositions. For these reasons, it has been the practice to provide inflatable tubular seals of silicone rubber compositions which are highly temperature resistant and not adversely affected by very low or very high temperatures which are encountered at supersonic speeds.

Accordingly it is of utmost importance that the inflatable canopy seal be reliable and strong but at the same time be capable of flexure while in the processes of inflation and deflation.

In the construction of these inflatable tubular seals, it has accordingly been the practice to reinforce the silicone rubber or other elastomeric inflatable tubular seal with fabrics of various types and designs. In order to further strengthen the wall of the tubular seal, it has also been the practice to reinforce the elastomeric wall with glass fabric of various types. It has been found that certain positive disadvantages arise from the use of glass fabric since the alkaline nature of the glass tends to cause the elastomer to depolymerize at elevated temperatures, thereby deteriorating the elastomeric material and jeopardizing the character and integrity of the seal.

A primary object of the present invention is, accordingly, to provide a reinforced inflatable seal which can withstand sustained flexing, bending and distortion.

A further object of the invention is to provide a reinforced aircraft seal providing preferably a knitted reinforcement which is stretchable with the elastomeric material of the inflatable seal, allowing accurate conformance of the seal with the opposing surface on inflation.

Other objects of the invention will become increasingly apparent from a perusal of the following description taken in connection with the following drawings, and the scope of the invention will be defined by the claim.

Referring to the drawings, where typical embodiments of the invention are shown for illustrative purposes:

Figure 1:
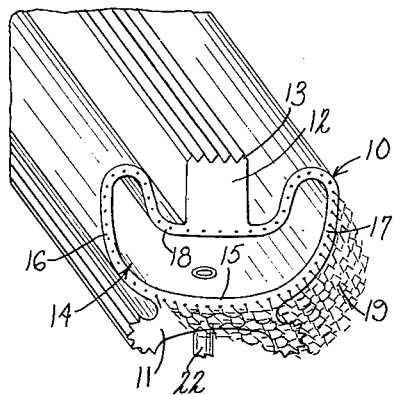
FIG. 1 shows a perspective view of an end portion of an inflatable seal formed in accordance with the principles of the present invention.
Figure 4:
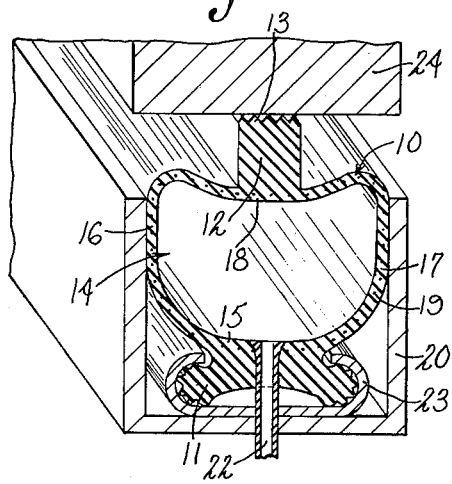
Figure 5:
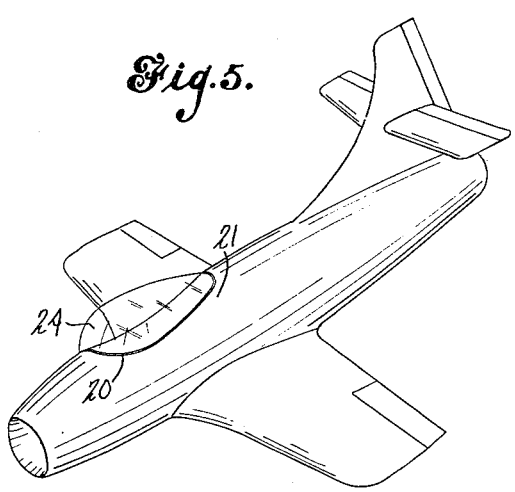

FIG. 4 is a perspective sectional view of the inflatable seal construction illustrated in FIG. 1, disposed in the channel surrounding an aircraft canopy or similar construction and in fully inflated position against the peripheral edge of the canopy or other wall or surface against which the seal is designed to have essentially airtight sealing engagement; and FIG. 5 illustrates the installation of the improved inflatable sealing strip around the periphery of an aircraft canopy.

In accordance with the invention, an inflatable sealing strip is provided for disposition between spaced apart elements comprising a base portion of flexible rubber-like material for retention in a channel or other suitable retaining means, and an essentially tubular inflatable element mounted on said base portion and including therewith a woven wire reinforcement embedded in the wall of the tubular inflatable element and coextensive therewith circumferentially to strengthen and reinforce the tubular element on inflation thereof.

In accordance with a preferred embodiment of the present invention, the woven wire reinforcement is of knitted construction so as to be capable of a limited degree of stretching or expansion along with the said elastomeric tubular inflatable element when the latter is expanded by a suitable fluid into sealing engagement of the inflatable sealing strip with the opposing surface.

Referring to the drawings, and more particularly to FIGS. 1 and 4, the construction of the aircraft canopy seal includes an inflatable endless sealing strip 10 having a molded base or foot portion 11 for the retention of the inflatable sealing strip 10 in a channel or other appropriate holding means for the seal, and an integral flexible closing or sealing projection or element 12, as clearly apparent from the illustrative embodiments of the invention shown in the drawings.

In order to enhance the sealing characteristics of the striking or closing element 12, a plurality of longitudinal ribs 13 are suitably molded into the upper face of the closing element 12. The elongated endless sealing strip 10 is suitably molded to form an air- and fluid-proof tubular member which is integrated and attached during the molding process to the sealing projection or striking element 12 on the one hand and to the base or foot portion 11 on the other. The sealing strip 10 includes an essentially tubular inflatable element 14, which includes a bottom portion 15 integrally attached to the molded foot portion 11, side walls 16 and 17, and a top wall 18 upon which is mounted the sealing or closing element 12, the construction and arrangement of which are fully obvious from the illustrative embodiment of the invention shown in FIGS. 1 and 4 of the drawing.

In accordance with the primary feature of the invention, for the purposes and objectives pointed out in the preceding paragraphs, the tubular inflatable element, indicated generally by the numeral 14, is provided with a woven metal wire reinforcement 19 which is embedded in the wall of the tubular inflatable element 14 and is essentially coextensive therewith circumferentially. This woven metal wire reinforcement 19 may take various forms, but is preferably in the form of a flexible knitted metal fabric of the type illustrated in FIG. 2 of the drawings. The use of a knitted metal fabric of this configuration allows the fabric to stretch coextensively within limits with the relatively elastic and stretchable rubber tubular element 14, as will be readily appreciated. This arrangement facilitates the proper and adequate expansion of the inflatable tubular element 14 into airtight sealing engagement with the opposing surface or element, and at the same time provides a superior reinforcement for the wall of the inflatable seal. This is of particular importance and advantage since the superior reinforcing characteristics of the woven wire reinforcement tends to provide reinforcement to the wall of the seal essentially throughout its length and to preclude blow-out or rupture of the tube at weak spots which may have been created during the molding process.

Figure 2:
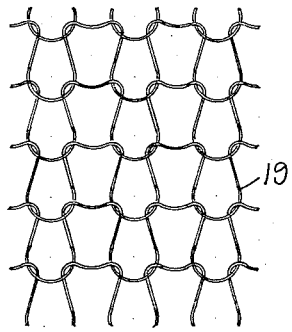
FIG. 2 is a detail of the preferred knitted metal fabric reinforcement employed in the construction of FIG. 1.
Figure 3:
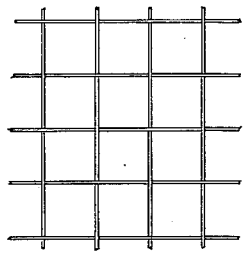
FIG. 3 is a detail of a screen-wire type of reinforcement which may be used in a modified embodiment of the inflatable seal construction formed in accordance with the present invention.

The woven wire reinforcement 19 is preferably a mesh fabric formed of strands of Inconel metal wire of 0.0045 inch thickness, wherein the strands are linked together by a knitted weave in the manner shown in detail in FIG. 2 of the drawings. The loop dimensions in the mesh are approximately 0.095 inch, and the construction is such that the knitted fabric is susceptible to a limited degree of stretching in both the longitudinal and transverse directions. It is understood, of course, that other metals having the required flexibility may be used, and that the size of the strands and dimensions of the loops may be varied widely without sacrificing the beneficial reinforcing properties imparted to the tubular inflatable member 14, as will be readily understood. A modified form of mesh reinforcement is illustrated in FIG. 3 of the drawings, wherein a simple screen-wire crossweave is employed instead of the knitted construction illustrated in the preferred embodiments shown in FIGS. 1 and 2 of the drawings.

FIG. 4 shows the improved inflatable seal of the invention positioned within the receiving channel 20 in the fuselage of an aircraft 21, wherein a source of compressed fluid medium, such as air, not shown, is connected with the inflating stem 22, which communicates the fluid-pressure source with the interior of the inflatable seal 10.

As indicated in FIG. 4, the foot portion 11 of the inflatable seal 10 is securely held by the clamping portion 23, which is secured at the bottom of the receiving channel 20 which extends around the periphery of the aircraft cockpit, door or other opening to be sealed through application of the inflatable sealing tube 10. The sealing strip 10 is shown in in its fully inflated position in FIG. 4 of the drawings, with the striker portion 12 in snug airtight sealing engagement with the peripheral edge of the plastic aircraft canopy top 24.

It will be readily understood that many methods may be employed for the fabrication of the tubular inflatable element 14 with the woven metal fabric reinforcement 19, in accordance with the present invention. A preferred method involves calendering a sheet of uncured silicone rubber compound between two pieces of Holland cloth to the desired thickness. The Holland cloth is removed from one side of the sheeted silicone rubber compound and replaced by a layer of woven wire mesh of dimensions coextensive with the sheet of silicone elastomer, and the assembly again run through the calender to embed the wire mesh into the surface of the sheeted silicone rubber base.

The unvulcanized silicone rubber sheet containing the embedded wire cloth is then cured, and thereafter a further sheet of uncured silicone rubber, prepared in the same manner as the base sheet, is laminated to the wire mesh side of the base sheet. The assembly is then applied to a mandrel of appropriate shape and dimensions for the finished product, with the uncured side of the laminate against the mandrel. The assembly is then encased in a surrounding mold having grooved channels filled with uncured silicon rubber to provide the striker or closing element and the foot or base portion, as will be readily understood. The assembly is cured under heat and pressure.

What I claim is:

An inflatable sealing strip for disposition in a channel between an element of an aircraft and a closing element adjacent said channel to be sealed against external pressure variation, said strip including an integral base portion of flexible silicone rubber adapted to be fixedly disposed in said channel and an essentially annular inflatable element mounted integrally on said base portion, a woven metal fabric embedded in and coextensive with said tubular inflatable element longitudinally and circumferentially, said woven metal fabric being constituted by loosely looped interwoven strands of metal wire linked together in a manner such that on expansion of said inflatable element the loosely woven metal fabric is susceptible to a predetermined limited degree of stretching in both longitudinal and transverse directions to positively prevent rupture of the said inflatable element when subjected to a condition of extreme pressure differential.

References Cited in the file of this patent

UNITED STATES PATENTS

| | | |
|---|---|---|
| 2,139,780 | Tea | Dec. 13, 1938 |
| 2,601,512 | Gagnier | June 24, 1952 |
| 2,654,922 | Krupp | Oct. 13, 1953 |
| 2,720,011 | Krupp | Oct. 11, 1955 |